United States Patent [19]

Kitada

[11] Patent Number: 5,068,500
[45] Date of Patent: Nov. 26, 1991

[54] WIPER DRIVING APPARATUS

[75] Inventor: Katsuyoshi Kitada, Kiryu, Japan

[73] Assignee: Mitsuba Electric Manufacturing Co., Ltd., Gunma, Japan

[21] Appl. No.: 405,962

[22] Filed: Sep. 12, 1989

[30] Foreign Application Priority Data

Sep. 16, 1988 [JP] Japan ............................. 63-121492[U]

[51] Int. Cl.⁵ .......................... H01H 19/00; B60S 1/00
[52] U.S. Cl. .................................................. 200/19 R
[58] Field of Search ........... 15/250.12, 250.13, 250.16, 15/250.17, 250.30; 200/19 R, 37 R, 61.39, 501; 318/DIG. 2, 441–444

[56] References Cited

U.S. PATENT DOCUMENTS

| | | | |
|---|---|---|---|
| 4,559,484 | 12/1985 | Hirano | 15/250.17 X |
| 4,607,198 | 8/1986 | Tsunoda | 318/DIG. 2 |
| 4,700,026 | 10/1987 | Kamiyama et al. | 200/19 R |
| 4,795,867 | 1/1989 | Ohi et al. | 200/501 X |

Primary Examiner—J. R. Scott
Attorney, Agent, or Firm—Rodman & Rodman

[57] ABSTRACT

The wiper driving apparatus includes a driving gear driven by an electric motor for driving a wiper, a clutch member rotatable together with the driving gear in a predetermined driving direction of the driving gear, first and second electrically-conductive plates and first and second moving-contact segments which are rotated relative to the first and second electrically-conductive plates respectively while brought into a slidable contact therewith, respectively, to constitute a switch for opening and closing an electric circuit of the motor. A driven engaging projection of the clutch member extends towards the driving gear, and is disposed in a position differing in phase from a contact position by an angle of at least 90 degrees, preferaly by an angle of 180 degrees, in which contact position a contact point of the second moving-contact segment is brought into electrical contact with the second electrically-conductive plate.

8 Claims, 4 Drawing Sheets

WIPER DRIVING APPARATUS

BACKGROUND OF THE INVENTION

1. Field of the Invention:

The present invention relates to a wiper driving apparatus, and more particularly to a wiper driving apparatus mounted on vehicles such as automobiles and the like used, for example, in the snow country.

2. Related Art Statement:

In general, in a wiper driving apparatus mounted on a vehicle such as automobiles and the like, in order to ensure a safe operation of the vehicle, there is provided an automatic wiper home position stop device which enables a wiper blade of the vehicle to return to its home position and stop thereat even when the user turns off a wiper switch of the vehicle at any time.

In a conventional wiper home position stop device of this type: an electrically-conductive plate, which is partially provided with an electrically non-conductive part, is fixed to an axial-end surface of a driving gear; electrical-contact points which constitute, together with the electrically-conductive plate, a switch for opening and closing an electric circuit of an electric motor is so disposed in a housing as to be slidably moved along the electrically-conductive plate when the driving gear is rotatably driven; and, even when the user turns off the wiper switch of the vehicle at any time, both the electrically-conductive plate and the electrical-contact points form an electric circuit for enabling the wiper blade of the vehicle to return to its home position in which, when the wiper blade is at its home position, the electrical-contact point is brought into a contact with an electrically non-conductive part of the electrically-conductive plate to break an electric circuit of a wiper motor, and then, the circuit is shortened to make an electric brake act, whereby operation of the wiper motor is automatically stopped.

However, in a vehicle provided with a conventional wiper driving apparatus having such wiper home position stop device, a bank of snow deposited over a lower part of the windshield of the vehicle often prevents the wiper blade from returning to its home position. Under such circumstances, the driving gear of the wiper driving apparatus is subjected to an external force which acts on the driving gear in a direction counter to its normal rotational direction or driving direction to cause the electrically-conductive plate and the electrical-contact point to alternately make and brake the circuit of the wiper motor, thus generating a chattering phenomenon. When the chattering occurs, the wiper driving apparatus is heated to a considerably high temperature, and is thereby damaged in quality and durability. This is a problem inherent in the conventional wiper driving apparatus.

SUMMARY OF THE INVENTION

It is an object of the present invention to provide a wiper driving apparatus for resolving the above chattering problem inherent in the prior art.

As disclosed in Japanese Utility Model Laid-Open Nos. 61-21657, 61-191960 which corresponds to U.S. Pat. No. 4,700,026, and as disclosed in Japanese Utility Model Laid Open No. 62-176068, applicant has proposed a plurality of wiper driving apparatus for resolving the chattering problem, in any of which apparatus: a clutch member is rotatable in a housing of the apparatus so as to rotate in a driving direction of a driving gear together with the same; and a switch for opening and closing an electric circuit of an electric motor is interposed between the clutch member and the housing of the apparatus, the switch being constructed of electrically-conductive plates and electrical-contact points; whereby, in normal operation, the electrical-contact points are rotatably driven by the driving gear through the clutch member relative to the electrically-conductive plates fixedly mounted on the housing through an electrical insulation substrate; and, in a condition in which the driving gear is subjected to an external force which forces the driving gear to rotate in a direction counter to the normal driving direction thereof, the electrical-contact points are released from the driving gear by means of the clutch member so as to be prevented from moving in the direction counter to the driving direction of the driving gear.

It is a second object of the present invention to improve the wiper driving apparatus disclosed in the above U.S. Pat. No. 4,700,026.

According to the present invention, a wiper driving apparatus comprises: a driving gear driven by an electric motor, for driving a wiper blade; a clutch member so rotatably mounted in a housing of the apparatus as to rotate together with the driving gear in a rotational direction or normal driving direction of the driving gear; an electrically-conductive plate constituting a switch for opening and closing an electric circuit of the motor, the electrically-conductive plate being fixedly mounted on the housing through an electrical insulation substrate; and a moving-contact segment which is rotated relative to the electrically-conductive plate while brought into a slidable contact therewith, the moving-contact segment being so arranged as to be integrally rotated with the clutch member.

An engaging means for transmitting a driving force of the driving gear to the clutch member is disposed in a position differing in phase or angular position about an axis of the clutch means from a contact position by an angle of at least 90 degrees, in which contact position the moving-contact segment is brought into an electrical contact with the electrically-conductive plate.

In the wiper driving apparatus of the present invention, in normal operation, electrical-contact points of the moving-contact segment are rotatably driven by the driving gear through the clutch member relative to the electrically-conductive plates fixedly mounted on the housing through the electrical insulation substrate. On the other hand, in a condition in which the driving gear is subjected to an external force which forces the driving gear to rotate in a direction counter to the driving direction thereof, the electrical-contact points of the moving-contact segment are released from the driving gear by means of the clutch member so as to be prevented from moving in the direction counter to the driving direction of the driving gear.

By the way, in case of the conventional wiper driving apparatus having the engaging means for transmitting a driving force of the driving gear to the clutch member thereof disposed in a position not differing in phase or angular position from a contact position in which an electrical-contact point of the moving-contact segment is brought into an electrical contact with the electrically-conductive plate, the electrical-contact point of the moving-contact segment tilts in normal the driving direction of the driving gear in operation. As a result, when a wiper blade of the conventional wiper driving apparatus of the vehicle returns to its home position to stop thereat, the electrical-contact point of the moving-contact segment is brought again into an electrical contact with the electrically-conductive plate when the tilted contact restitutes due to its resiliency, thus producing the chattering phenomenon.

In contrast with this, in the wiper driving apparatus of the present invention, since the engaging means for transmitting the driving force of the driving gear to the clutch member is disposed in a position differing in phase from such contact position by an angle of at least 90 degrees or preferably by an angle of 180 degrees, the electrical-contact point of the moving-contact segment tilts in a direction counter to the driving direction of the driving gear in operation. As a result, when a windshield wiper blade of the wiper driving apparatus of the present invention returns to its home position to stop thereat, the electrical-contact point of the moving-contact segment is prevented from being brought again into an electrical contact with the electrically-conductive plate due to its resiliency, thus preventing the chattering from occurring.

The above and other objects and features of the present invention will become more apparent when referred to the following descriptions given in conjunction with the accompanying drawings, wherein like reference numerals denote like elements.

DESCRIPTION OF THE PREFERRED EMBODIMENTS

Hereinbelow, the present invention will be described in detail, by way of example, with reference to the accompanying drawings.

Figure 1:
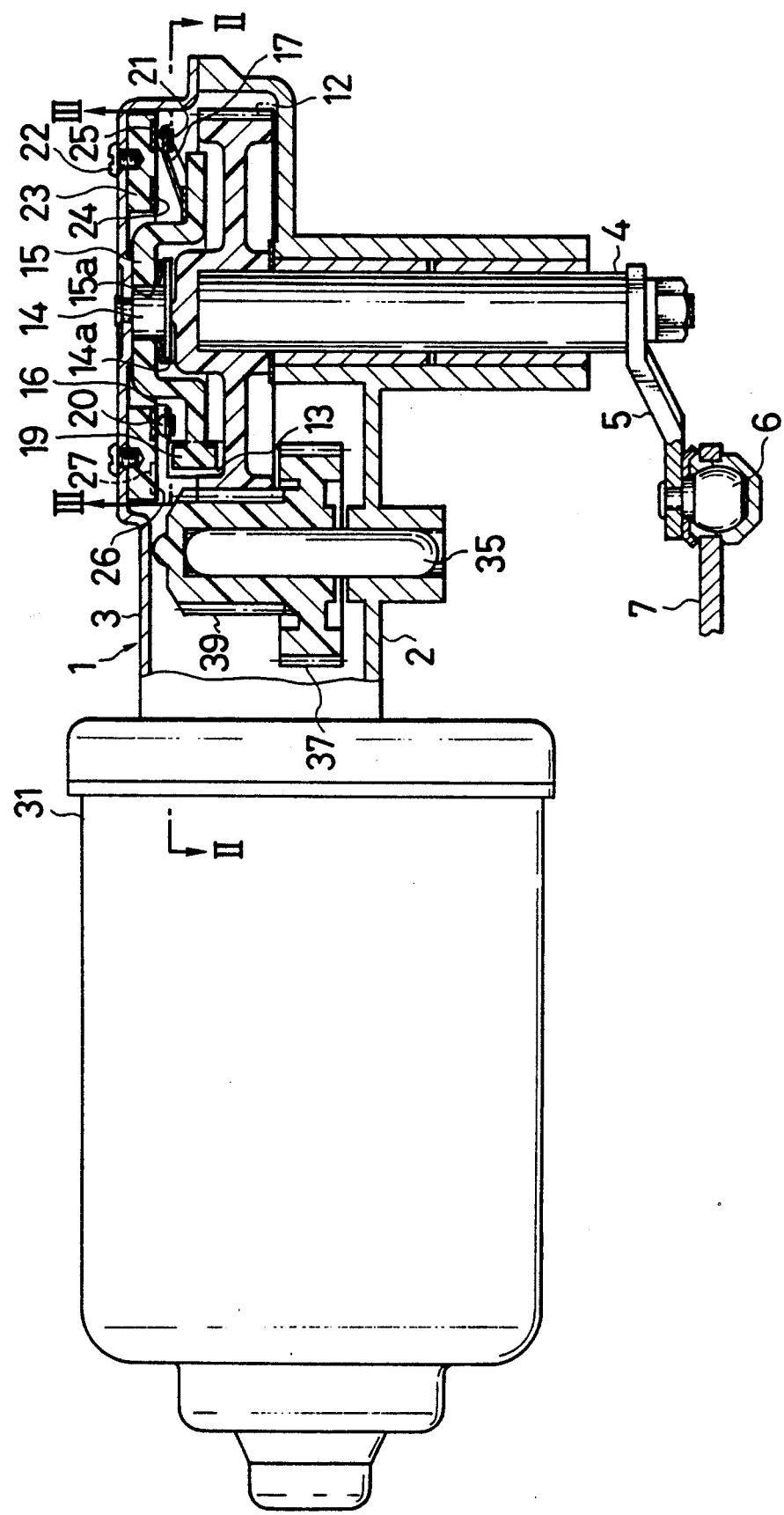
FIG. 1 is a longitudinal sectional view of an embodiment of the wiper driving apparatus of the present invention.

As shown in FIG. 1, a wiper driving apparatus of the present invention is provided with a housing 1 which is constructed of a main body 2 serving as a gear box and a lid element 3 mounted on an opening portion of the main body 2 to form a closed chamber. As shown in FIG. 1, in a substantially central portion of the main body 2, is rotatably mounted a crank shaft 4. A crank 5 is fixedly mounted on an end portion of the crank shaft 4, a free-end portion of which is rotatably connected with an end portion of a connecting rod 7 through a ball joint 6. The other end portion of the connecting rod 7 is rotatably connected with a free-end portion of a link 8. And the other end portion of the link 8 is fixedly mounted on a shaft 9 which is rotatably mounted on a lower part of a windshield portion of a vehicle such as automobiles. On the shaft 9, is fixedly mounted a wiper arm 10, a free-end portion of which supports a wiper blade 11.

In the interior of the housing 1, a driving gear 12, which is molded and made of hard synthetic resins, is fixedly mounted on an upper end portion of the crank shaft 4 in an insertion manner. A part of an axial surface of the driving gear 12 extends toward the lid element 3 or upward in FIG. 1 to form a driving engaging projection 13.

A supporting axle 14 is so fixedly mounted on an inner surface of the lid element 3 as to be lined up in axis with the crank shaft 4. The supporting axle 14 is suspended from the inner surface of the lid element 3. On the other hand, as is clear from FIG. 1, a clutch member 15 made of hard synthetic resins having electrical insulation properties assumes a hat-like shape with a central bore 15a in its sectional view. And the central bore 15a is rotatably mounted on the supporting axle 14 for rotatably supporting the clutch member 15. The supporting axle 14 is provided with a flange portion 14a in its lower-end portion to prevent the clutch member 15 from dropping therefrom. An end portion of a first moving contact segment 16 and an end portion of a second moving-contact segment 17 are fixedly mounted on the clutch member 15 to enable these moving-contact segments 16, 17 to rotate together with the clutch member 15. Each of the moving-contact segments 16, 17 is constructed of a resilient and electrically-conductive sheet assuming a substantially rectangular shape in plan which is formed, for example, by blanking brass sheets and the like. The first moving-contact segment 16 is electrically connected with the second moving-contact segment 17 through a connecting segment 18. In addition, each of the moving-contact segments 16, 17 is slightly curved in width direction thereof to enable its electrical-contact point 20, 21 to constantly push against an electrically-conductive plates under the influence of resiliency of each of the moving-contact segments 16, 17.

On the other hand, a part of an axial-end surface of the clutch member 15 is formed into a driven engaging projection 19 extending toward the axial-end surface of the driving gear 12. The driven engaging projection 19 of the clutch member 15 is so constructed as to be engaged with the driving engaging projection 13 of the driving gear 12 only at a time when the driving gear 12 is rotated in its normal driving direction. And, this driven engaging projection 19 is disposed in a position differing in phase from a contact position by an angle of 180 degrees, in which contact position a second electrical-contact point 21 of the second moving-contact segment 17 is brought into an electrical contact with a second electrically-conductive plate 25 described later. The second electrical-contact point 21 is provided in a free-end portion of the second electrical contact segment 17, while constructed of an electrically-conductive wear-resisting tip member.

On the other hand, in a free-end portion of the first moving-contact segment 16 is provided a first electrical-contact point 20 which is constructed of an electrically-conductive wear-resisting tip member. The first electrical-contact point 20 of the first moving-contact segment 16 is oppositely disposed from the second electrical-contact point 21 of the second moving-contact segment 17 on the diameter of the clutch member 15 so that a pair of resilient forces exerted by the first moving contact segment 16 and the second moving-contact segment 17 due to resiliency thereof are balanced with each other on the supporting axle 14 of the clutch member 15.

Namely, when the electrical-contact points 20, 21 of the moving-contact segments 16, 17 push against electrically-conductive plates 24, 25, each of such pushing forces exerted by the first contact point 20 and the second contact point 21 or the moving-contact segments 16, 17 has an equal effect in the opposite direction acting on the clutch member 15 supported on the supporting axle 14. Consequently, in case that the first contact point 20 and the second contact point 21 are not balanced in construction with each other on the supporting axle 14, the above-mentioned pushing forces are not balanced on the supporting axle 14 to cause the supporting axle 14 to have excessive wear in operation. This is a finding obtained by the inventor of the present invention. In order to resolve such excessive-wear problem of the supporting axle 14, according to the present invention, the first electrical-contact point 20 is so arranged in construction as to be oppositely disposed from the second electrical-contact point 21 on the diameter of the clutch member 15 or on the diameter of the supporting axle 14 so that the pushing forces exerted by the first contact point 20 and the second contact point 21 against the electrically-conductive plates 24, 25 and the clutch member 15 supported by the supporting axle 14 are balanced with each other on the supporting axle 14 to prevent the supporting axle 14 from having excessive wear.

In an inner surface of the lid element 3, there is provided an electrical insulation substrate 23 which is made of electrical insulation materials such as suitable synthetic resins and the like and assumes a substantially circular shape coaxially arranged with the supporting axle 14. The electrical insulation substrate 23 is fixedly mounted on the inner surface of the lid element 3 by a suitable fastening means such as screws 22 and the like. In a lower surface of the electrical insulating substrate 23 are provided: a first electrically conductive plate 24 and a second electrically-conductive plate 25 both of which are coaxially arranged with the supporting axle 14 while fixedly embedded in the lower surface of the electrical insulating substrate 23 as is clear from FIG. 1.

The first electrically-conductive plate 24 is disposed inside the second electrically-conductive plate 25, and assumes a circular shape. As described above, against the first electrically-conductive plate 24 the first electrical-contact point 20 of the first moving-contact segment 16 is constantly pressed under the influence of resiliency of the first moving-contact segment 11. On the other hand, the second electrically-conductive plate 25 is disposed outside the first electrically-conductive plate 24 and assumes a substantially C-shaped form or substantially circular shape with a partial cutout which forms an electrically non-conductive part 26. In an intermediate area of the electrically non-conductive part 26 is disposed an electrically-conductive stop-position segment 27 assuming a substantially fan-like shape. The electrically-conductive stop-position segment 27 is constructed of electrically-conductive sheets. The second electrically-conductive plate 25 and the electrically non-conductive part 26 thereof form a substantially circular path together with the electrically-conductive stop-position segment 27. Against such circular path, the second electrical-contact point 21 of the second moving-contact segment 17 is resiliently pressed constantly under the influence of resiliency of the second moving-contact segment 17.

Figure 4:
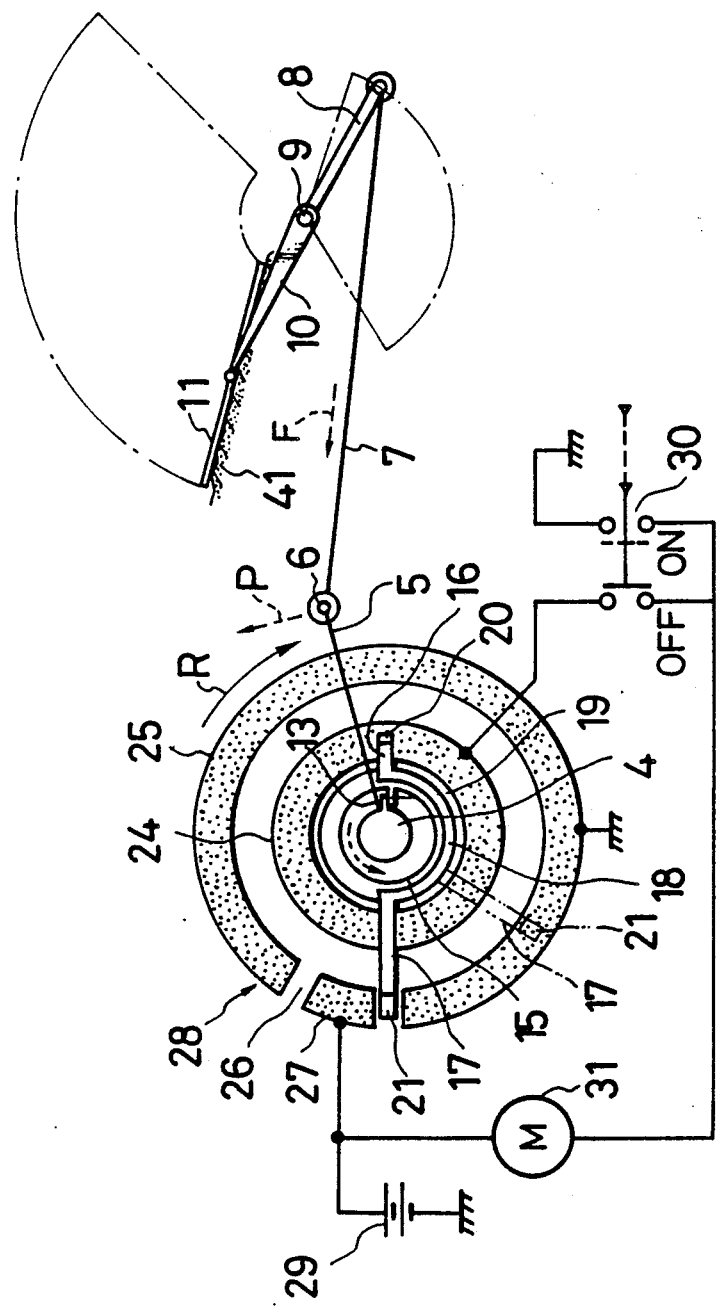
FIG. 4 is schematic diagram showing the entire control system of the wiper driving apparatus of the present invention shown in FIG. 1.

As shown in FIG. 4, in a circuit comprising an electric power source 29, a wiper switch 30 and the electric motor 31, a switch 28 for opening and closing the circuit is constructed of the first electrically-conductive plate 24, the second electrically-conductive plate 25 and the electrically-conductive stop-position segment 27, this switch 28 being effective when the wiper switch is at OFF position.

Figure 2:
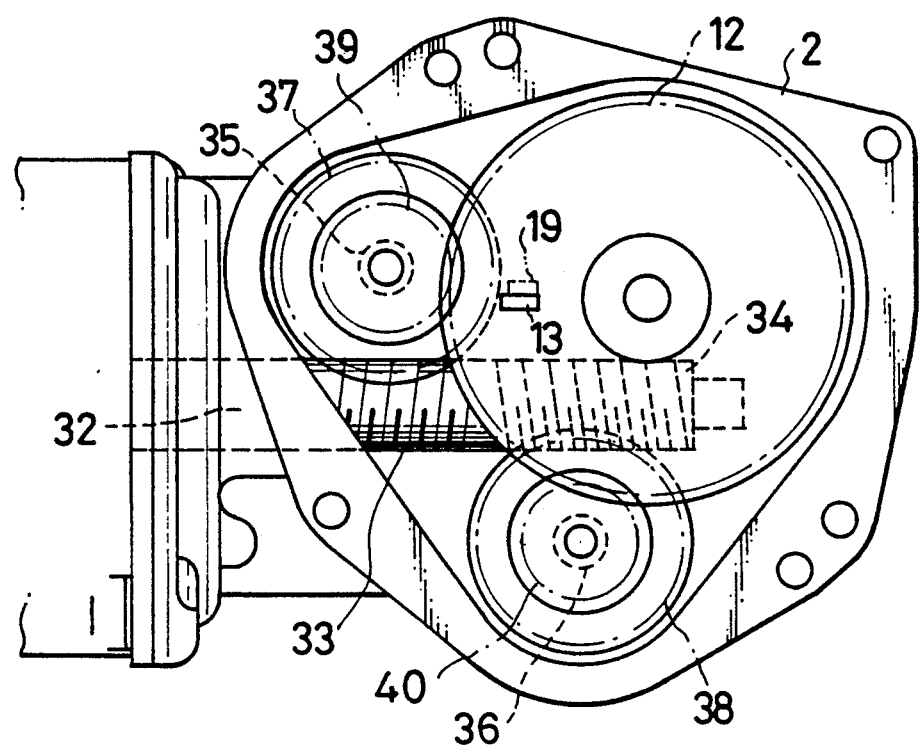
FIG. 2 is a plan view of the embodiment of the wiper driving apparatus of the present invention, taken along the line II—II of FIG. 1.

The motor 31 is fixedly mounted on a side of the housing 1 so that a rotary shaft 32 of the motor 31 passes through a side wall of the main body 2 to enter the interior of the housing 1, and extends in a direction perpendicular to an axis of the crank shaft 4 to form an extension or inserted portion of the rotary shaft 32, on an outer peripheral portion of which insertion portion are integrally formed a pair of a left-handed worm 33 and a right handed worm 34 which are meshed with a pair of worm wheels 37 and 38, respectively. These worm wheels 37 and 38 are oppositely disposed from each other with respect to the rotary shaft 32 of the motor 31 as shown in FIG. 2, while rotatably mounted on a pair of supporting shafts 35 and 36, respectively. These supporting shafts 35 and 36 are so disposed as to be parallel to the crank shaft 4, while integrally provided with a pair of intermediate gears 39 and 40, respectively. These intermediate gears 39 and 40 are coaxially arranged with the supporting shaft 35 and 36 respectively, while meshed with the driving gear 12.

Now, operation of the above embodiment of the wiper driving apparatus of the present invention will be described.

(1) Wiping Operation:

When the wiper switch 30 is turned on, an electric circuit of the motor 30, comprising the electric power source 29, motor 31, "ON" contact points of the wiper switch 30 and the ground connection is closed to allow an electric current to pass through the electric circuit of the motor 30 so that the motor 30 rotates to produce a driving force.

The driving force produced in the motor 30 is then transmitted to the driving gear 12 through the rotary shaft 32 of the motor 30, worms 33 and 34, worm wheels 37 and 38, and the intermediate gears 39 and 40. In this case, with respect to the rotary shaft 32, the left-handed worm 33 of the rotary shaft 32 meshes with the worm wheel 37 in a position oppositely disposed from a position in which the right-handed worm 34 of the rotary shaft 32 meshes with the worm wheel 38. Consequently, reactions caused by these worm wheels 37, 38 are substantially balanced with each other on the rotary shaft 32 to improve the rotary shaft 32 in its power-transmitting efficiency and durability in operation.

When the driving force of the motor 31 is transmitted to the driving gear 12 through the intermediate gears 39 and 40 to rotatably drive the driving gear 12 in its normal driving direction R, the rotational motion of the driving gear 12 is transmitted to the crank 5 of the crank shaft 4 to rotatably drive the crank 5. Then, rotational motion of the crank 5 is converted into reciprocating motion of the wiper arm 10 through the ball joint 6, connecting rod 7, link 8 and the shaft 9, to enable the wiper blade 11 to conduct its wiping operation.

Figure 3:
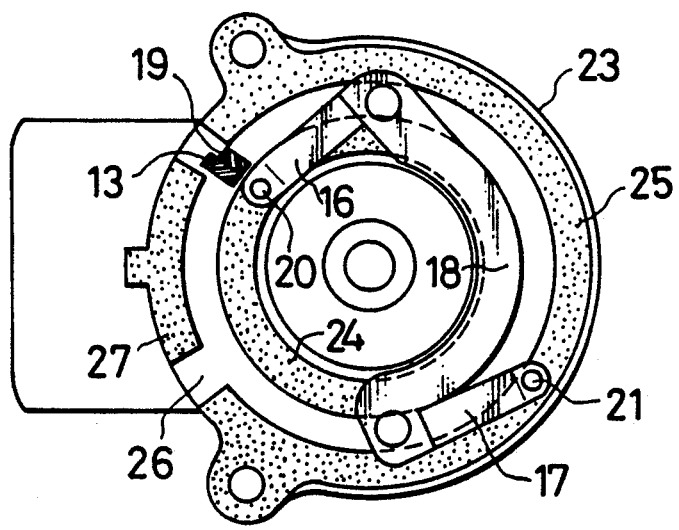
FIG. 3 is a bottom view of the embodiment of the wiper driving apparatus of the present invention, taken along the line III—III of FIG. 1.

During a period of the wiping operation, the driving engaging projection 13 of the driving gear 12 is engaged with the driven engaging projection 19 of the clutch member 15 to rotatably drive the clutch member 15 which rotates in the driving direction R of the driving gear 12 together with the same 12. At this time, as is clear from FIG. 3, the first electrical-contact point 20 of the first moving-contact segment 16 and the second electrical-contact point 21 of the second moving-contact segment 17 both of which are fixedly mounted on the clutch member 15 are slidably moved along the first electrically-conductive plate 24 and the second electrically-conductive plate 25, respectively. However, these slidable motions of the electrical-contact points 20, 21 do not affect the motor 31 in its rotational motion at all because the electric circuit of the motor 31 is always closed bypassing the switch 28 when the wiper switch 30 is at ON position.

(2) Normal Home Position Stop Operation:

When the wiper switch 30 is turned off, its "ON" contact points are separated from each other while its "OFF" contact points are engaged with each other.

In case that the wiper switch 30 is turned off by the user at a time when the wiper blade 11 is still not returned to its home position, the first electrical-contact point 20 and the second electrical-contact point 21 remain in contact with the first electrically-conductive plate 24 and the second electrically-conductive plate 25, respectively. Namely, the electric circuit of the motor 31 remains closed so that electric current flows through the electric power source 29, motor 31, "OFF" contact points of the wiper switch 30, first electrically-conductive plate 24, first electrical-contact point 20, first moving-contact segment 16, connecting segment 18, second moving-contact segment 17, second electrical-contact point 21, second electrically-conductive plate 25 and the ground, whereby the motor 31 keeps on rotating.

As a result of further rotation of the motor 31, when the second electrical-contact point 21 of the second moving-contact segment 17 reaches the electrically non-conductive part 26 of the second electrically-conductive plate 25 to open the electric circuit of the motor 31, power supply to the motor 31 is stopped. After that, the motor 31 still keeps on rotating due to inertia forces of rotating components of the wiper driving apparatus such as the motor 31, driving gear 12 and the like. As a result of inertial rotation of the motor 31, when the second electrical-contact point 21 of the second moving-contact segment 17 reaches the wiper home position stop segment 27, an electric circuit of the motor 31 is closed so that electric current may flow through the second electrical-contact point 21, wiper home position stop segment 27, motor 31, "OFF" contact points of the wiper switch 30, first electrically-conductive plate 24, first electrical-contact point 20, first moving-contact segment 16, connecting segement 18, second moving-contact segment 17 and the second electrical-contact point 21. Thus, the circuit is shortened and the electric brake of the motor 31 is acted to immediately stop the rotation of the motor 31.

As a result of immediate stop of rotation of the motor 31, the wiper blade 11 stays at its home position in the lower portion of the windshield of the vehicle. Consequently, as described above, even when the user turns off the wiper switch 30 of the wiper driving apparatus of the present invention at any time, the wiper blade 11 may return to its home position to stay thereat without fail.

(3) Stopping Operation in Abnormalities:

For example, as shown in FIG. 4, in case that the wiper blade 11 is subjected to an external force exerted by a bank of snow 41 deposited over a lower part of the windshield of the vehicle, the wiper arm 10 is subjected to an external force F which acts on the connecting rod 7 in the direction of the arrow shown by dashed lines in FIG. 4. As a result, the crank shaft 4 is subjected to a counter torque P through the crank 5 on which the counter torque P acts in a direction counter to the driving direction R of the driving gear 12.

Under such circumstances, if the electrically-conductive plate 25 or the second electrical-contact point 21 is so constructed as to be integrally rotated with the driving gear 12 always as in the conventional wiper driving apparatus, the second electrical-contact point 21 having reached the electrically non-conductive part 26 according to normal rotation of the driving gear 12 returns to the electrically-conductive plate 25 so as to be brought again into an electrical contact therewith because the driving gear 12 is rotatably driven in a direction counter to it driving direction R under the influence of the counter torque P acting on the crank shaft 4. As a result, the motor 31 is operated again to rotatably drive the driving gear 12 in its normal driving direction R, whereby the second electrical-contact point 21 reaches the electrically non-conductive part 26 again. When the second electrical-contact point 21 has reached the electrically non-conductive part 26 again, the counter torque P is applied again to the crank shaft 4 to return the second electrical-contact point 21 to the electrically-conductive plate 25. After that, the above operation is repeated to produce the chattering phenomenon as the second electrical-contact point 21 and the electrically-conductive plate 25 are connected and disconnected repeatedly.

In contrast with the above wiper chattering occurrence in the conventional wiper driving apparatus, in the embodiment of the wiper driving apparatus of the present invention, since the clutch member 15 is interposed between the driving gear 12 and the second electrical-contact point 21 of the second moving-contact segment 17, such wiper chattering is prevented from occurring.

Namely, as shown in FIG. 4, when the wiper blade 11 is pushed back with the bank of snow 41 deposited over the lower part of the windshield of the vehicle in a condition in which the second electrical-contact point 21 reaches the electrically non-conductive part 26 to open the electric circuit of the motor 31, the counter torque P acts on the crank shaft 4 to rotatably drive the driving gear 12 in a direction counter to its normal driving direction R. However, in the wiper driving apparatus of the present invention, the driving engaging projection 13 of the driving gear 12 is disengaged from the driven engaging projection 19 of the clutch member 15 when the driving gear 12 is rotated in a direction counter to its normal driving direction R. Consequently, in this case, in the wiper driving apparatus of the present invention, the clutch member 15 is prevented from rotating in the direction counter to the normal driving direction R of the driving gear 12 so that the second electrical-contact point 21 of the second moving-contact segment 17 fixedly mounted on the clutch member 15 is also prevented from rotating in the direction counter to the normal driving direction R of the driving gear 12, whereby the electric circuit of the motor 31 remains open to permit the wiper blade 11 to stay still at the lower part of the windshield of the vehicle.

Figure 5:
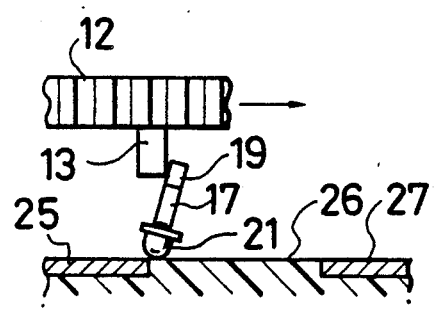
FIG. 5 is a schematic side view showing the conventional wiper driving apparatus in operation.

In the "Stopping Operation in Abnormalities" described in the above item (3), in case that the second electrical-contact point 21 of the second moving-contact segment 17 fixedly mounted on the clutch member 15 is disposed in a position not differing in phase, or angular position about an axis of the clutch member 15 from the driven engaging projection 19 of the clutch member 15, the wiper chattering can occur in extremely severe conditions because both of the second moving-contact segment 17 carrying the second electrical-contact point 21 and the clutch member 15 carrying the second moving-contact segment 17 may be elastically deformed to permit the second electrical-contact point 21 carried by the second second moving-contact segment 17 to tilt alternately in the driving direction R of the driving gear 12 and a direction counter thereto in a condition in which the second electrical-contact point 21 is brought into contact with a boundary area between the second electrically-conductive plate 25 and the electrically non-conductive part 26, as shown in FIG. 5.

Namely, as shown in FIG. 5, in the clutch member 15, in case that the second electrical-contact point 21 of the second moving-contact segment 17 is disposed in a position not differing in phase from the driven engaging projection 19, the second electrical-contact point 21 tilts in the driving direction R of the driving gear 12 when separating from the second electrically-conductive plate 25. Consequently, in the "Stopping Operation in Abnormalities" described in the above item (3), when the driving gear 12 rotates in a direction counter to the driving direction R, the second electrical-contact point 21 of the second moving-contact segment 17 is brought again into an electrical contact with the second electrically-conductive plate 25 because the contact 21 is restituted due to resiliencies of the clutch member 15 and the second moving-contact segment 17 so that the electric circuit of the motor 31 is closed again to enable the motor 31 to drive the driving gear 12 in its normal driving direction R, whereby the second electrical-contact point 21 returns to the electrically non-conductive part 26. When the second electrical-contact point 21 returns to the electrically non-conductive part 26, the counter torque P is applied again to the crank shaft 4 to cause the second electrical-contact point 21 to be brought into an electrical contact with the second electrically-conductive plate 25. After that, the above operation is repeated so that the wiper chattering occurs.

Figure 6:
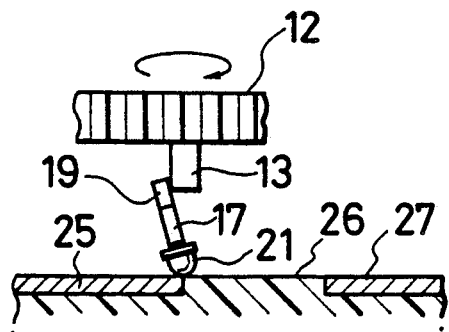
FIG. 6 is a schematic side view showing the operation of the wiper driving apparatus of the present invention.

However, in the clutch member 15 of the wiper driving apparatus of the present invention, since the second electrical-contact point 21 of the second moving-contact segment 17 is disposed in a position differing in phase from the driven engaging projection 19 of the clutch member 15 by an angle of at least 90 degrees, preferably by an angle of 180 degrees, the wiper chattering is completely prevented from occurring. Namely, in the present embodiment in which the second contact 21 is disposed in phase of 180 degrees from the driven engaging projection 19, as shown in FIG. 6, the second electrical-contact point 21 of the second moving-contact segment 17 tilts in a direction counter to the driving direction R of the driving gear 12 when separating from the second electrically-conductive plate 25. Consequently, after that, even when the driving gear 12 rotates in a direction counter to its normal driving direction R in conditions of "Abnormalities" (above (3)) to permit the second electrical-contact point 21 to return to its normal upright position, the second electrical-contact point 21 simply moves to the electrically non-conductive part 26 to open the electric circuit of the motor 31, whereby the wiper chattering is prevented from occurring.

As described above, in the embodiment of the wiper driving apparatus of the present invention, the clutch member 15 is interposed between the driving gear 12 and the switch 28, and the second moving-contact segment 17 carrying the second electrical-contact point 21 is fixedly mounted on the clutch member 15 at phase of 180 degrees from the driven engaging projection 19. Therefore, the chattering, which occurs when the counter torque P is exerted to the driving gear 12 by the bank of snow 41 deposited over the lower part of the windshield of the vehicle, is prevented from occurring, whereby a considerable amount of heat is prevented from being generated in the contact position between the second electrically-conductive plate 25 and the second electrical-contact point 21 of the second moving-contact segment 17, which considerable amount of heat damages the wiper driving apparatus of the present invention in its quality and durability.

In addition, in the wiper driving apparatus of the present invention, since the electrically-conductive plates are fixedly mounted on the housing 1 through the electrically insulating substrate 23, it is possible to reduce in size and to simplify in construction each of the clutch member 15 and the moving-contact segments. Further, the switch 28 is directly and reliably grounded without through the driving gear 12 and its bearing portions.

In the wiper driving apparatus of the present invention, since the electrically-conductive plates 24, 25 are embedded in the electrical insulation substrate 23 when the substrate is molded in manufacturing thereof, it is possible for the wiper driving apparatus to reduce the number of its components and the number of assembling steps thereof.

In the wiper driving apparatus of the present invention, since the clutch member 15 is positioned separately from the driving gear 12, there is no fear that the clutch member 15 is rotatably driven by the driving gear 12 through gear grease of the driving gear 12 at a time when the driving gear 12 rotates in a direction counter to its normal driving direction R.

Incidentally, while the present invention has been described in detail by referring to an illustrated embodiment, it is not intended that the present invention is so limited since various modifications can be made without departing from the scope of the present invention.

For example, in the clutch member 15 of the wiper driving apparatus of the present invention, the second electrical-contact point 21 may be disposed in a position differing in phase from the driven engaging projection 19 by an angle of at least 90 degrees, which angle is not limited to 180 degrees only.

Each of the electrical-contact points 20, 21 may be a convex part of the moving-contact segment itself 16, 17, and is not limited to a separate tip member fixed to each of the segments 16, 17.

In the wiper driving apparatus of the present invention, it is also possible that the driving gear 12 is directly driven by worms 33, 34 of the rotary shaft 32 of the motor 31.

As described above, according to the present invention, the clutch member is driven in a single direction or normal driving direction R by the driving gear, and the moving-contact segments carrying the electrical-contact point are fixedly mounted on the clutch member so as to rotate relative to the electrically-conductive plates fixedly mounted on the housing through the electrically insulating substrate.

In the wiper driving apparatus of the present invention, the moving contact segments are provided as separate members from the clutch member to be mounted thereto, therefore the contacts slide more stably on the conductive plates.

Further, in relation to the driven projection of the clutch member, contact point is located at the position where resiliencies of the clutch member and the moving-contact segment do not make the contact point return to contact with the conductive plate once it is departed from the conductive plate. Consequently, it is possible to prevent the chattering phenomenon from occurred, which chattering phenomenon hitherto occurring due to backward movement of the contact point relative to the conductive plate caused by counter rotational force applied to the driving gear.

What is claimed is:

1. A wiper driving apparatus driven by an electric motor comprising,
   a driving gear driven by said electric motor, said driving gear providing a driving force and being fixed to a rotatable shaft, said shaft having a rotational axis and being drivingly connected to a wiper,
   a clutch member rotatably supported on an axle, said axle being in axial alignment with said shaft,
   means for engaging said driving gear with said clutch member such that the driving force of said driving gear is transmitted to said clutch member to rotate said clutch member together with said driving gear in only one predetermined direction of rotation of said driving gear,
   an insulation substrate spaced from said clutch member, electrically conductive plates supported on said substrate and being of a form that is coaxial with respect to said support axle,
   a moving-contact segment joined to said clutch member for rotation with said clutch member relative to said conductive plates, said moving-contact segment having a contact portion in electrically conductive slidable contact with said conductive plates at a contact position such that said moving-contact segment and said conductive plates constitute part of a switch for opening and closing an electric circuit for operating said motor,
   said means for engaging said driving gear with said clutch member including a driver engaging projection provided on said driving gear and a driven engaging projection provided on the clutch for engagement with said driver engaging projection at an engagement position differing in phase from the contact position between said moving-contact segment and said conductive plates by an angle of at least 90°.

2. The wiper driving apparatus as set forth in claim 1, wherein:
   said engagement position differs in phase from said contact position by an angle of 180 degrees.

3. The wiper driving apparatus as set forth in claim 1 wherein said driving gear has an axial end surface extending toward said clutch member and said driver engaging projection is formed at said axial end surface, said driven engaging projection of said clutch member extending toward said axial end surface of said driving gear to engage said driver engaging projection of said driving gear only when said driving gear is rotatably driven in said one predetermined direction of rotation.

4. The wiper driving apparatus as set forth in claim 1 wherein said moving-contact segment includes two moving-contact segment members fixed to said clutch member, and a connecting segment electrically interconnecting said moving-contact segment members together.

5. The wiper driving apparatus as set forth in claim 4 wherein said clutch member has a diameter and each of said moving-contact segment members have respective contact points oppositely disposed from each other with respect to the diameter of said clutch member, said contact points being pressed in electrical contact against said conductive plates.

6. The wiper driving apparatus as set forth in claim 4 wherein said moving-contact segment members are electrically conductive and resilient members.

7. The wiper driving apparatus as set forth in claim 6 wherein said moving-contact segment members are directed toward said conductive plates to exert a resilient force against said conductive plates, said conductive plates include two conductive plate members of concentric circular shape, one of said conductive plate members defining a first circular path and having a non-conductive cutout portion representing an interruption in said first circular path, a conductive stop position segment being disposed in said cutout portion at the interruption of said first circular path such that said stop position segment is electrically insulated from said one conductive plate member and forms a partial continuation of said circular path with an insulated space between said stop position segment and said one conductive plate member, the contact point of one of said moving-contact segment members being constantly pressed against said first circular path under the influence of the resilient force exerted by a corresponding one of said moving-contact segment members, and the other said conductive plate member being disposed concentrically within said one conductive plate member and the contact point of the other said moving-contact segment member is constantly pressed against said other conductive plate member under the influence of the resilient force exerted by a corresponding other of said moving contact segment members.

8. A wiper driving apparatus driven by an electric motor comprising,
   a driving gear driven by said electric motor, said driving gear providing a driving force and being fixed to a rotatable shaft, said shaft having a rotational axis and being drivingly connected to a wiper,
   a clutch member rotatably supported on an axle, said axle being in axial alignment with said shaft,
   means for engaging said driving gear with said clutch member such that the driving force of said driving gear is transmitted to said clutch member to rotate said clutch member together with said driving gear in only one predetermined direction of rotation of said driving gear,
   an insulation substrate spaced from said clutch member, electrically conductive plates supported on said substrate and being of a form that is coaxial with respect to said support axle,
   a moving-contact segment joined to said clutch member for rotation with said clutch member relative to said conductive plates, said moving-contact segment having a contact portion in electrically conductive slidable contact with said conductive plates at a contact position such that said moving-contact segment and said conductive plates constitute part of a switch for opening and closing an electric circuit for operating said motor, said means for engaging said driving gear with said clutch member including a driver engaging projection provided on said driving gear and a driven engaging projection provided on the clutch for engagement with said driver engaging projection at an engagement position differing in phase from the contact position between said moving-contact segment and said conductive plates by an angle of at least 90°, and wherein said moving-contact segment includes two moving-contact segment members fixed to said clutch member, and a connecting segment electrically interconnecting said moving-contact segment members together, said conductive plates include two conductive plate members of concentric circular shape, one of said conductive plate members defining a first circular path and having a non-conductive cutout portion representing an interruption in said first circular path, a conductive stop position segment being disposed in said cutout portion at the interruption of said first circular path such that said stop position segment is electrically insulated from said one conductive plate member and forms a partial continuation of said circular path with an insulated space between said stop position segment and said one conductive plate member, the contact point of one of said moving-contact segment members being constantly pressed against said first circular path under the influence of the resilient force exerted by a corresponding one of said moving-contact segment members, and the other said conductive plate member being disposed concentrically within said one conductive plate member, and the contact point of the other said moving-contact segment member is constantly pressed against said other conductive plate member under the influence of the resilient force exerted by a corresponding other of said moving contact segment members, and wherein said phase difference angle is measured between the contact point of said one moving-contact segment member and said engagement position.

* * * * *